May 10, 1960
M. E. FORSHEE
2,936,074
BALANCE CONTROL WATER SCREEN
Filed July 17, 1958
2 Sheets-Sheet 1
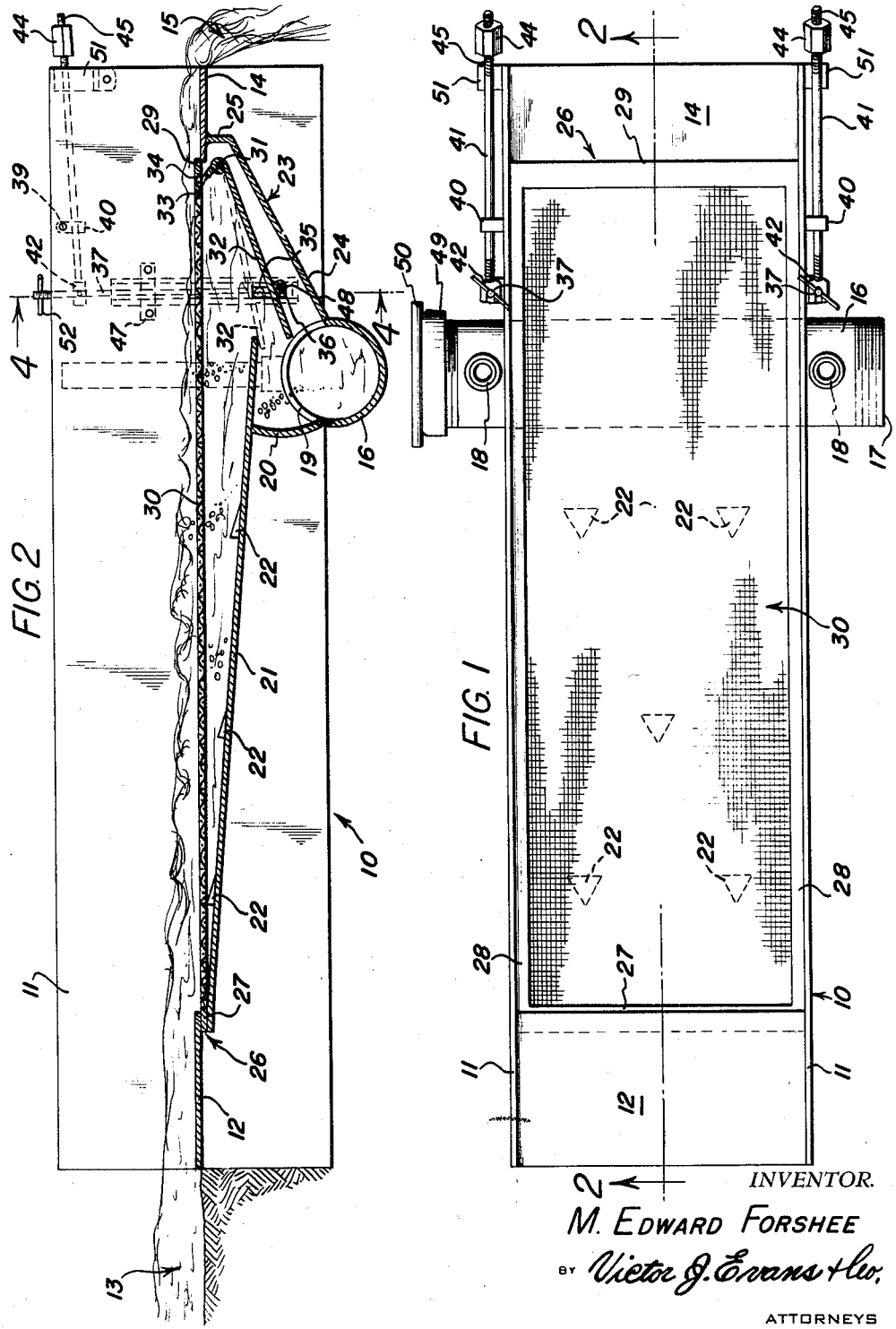
INVENTOR.
M. EDWARD FORSHEE
BY *Victor J. Evans & Co.*
ATTORNEYS

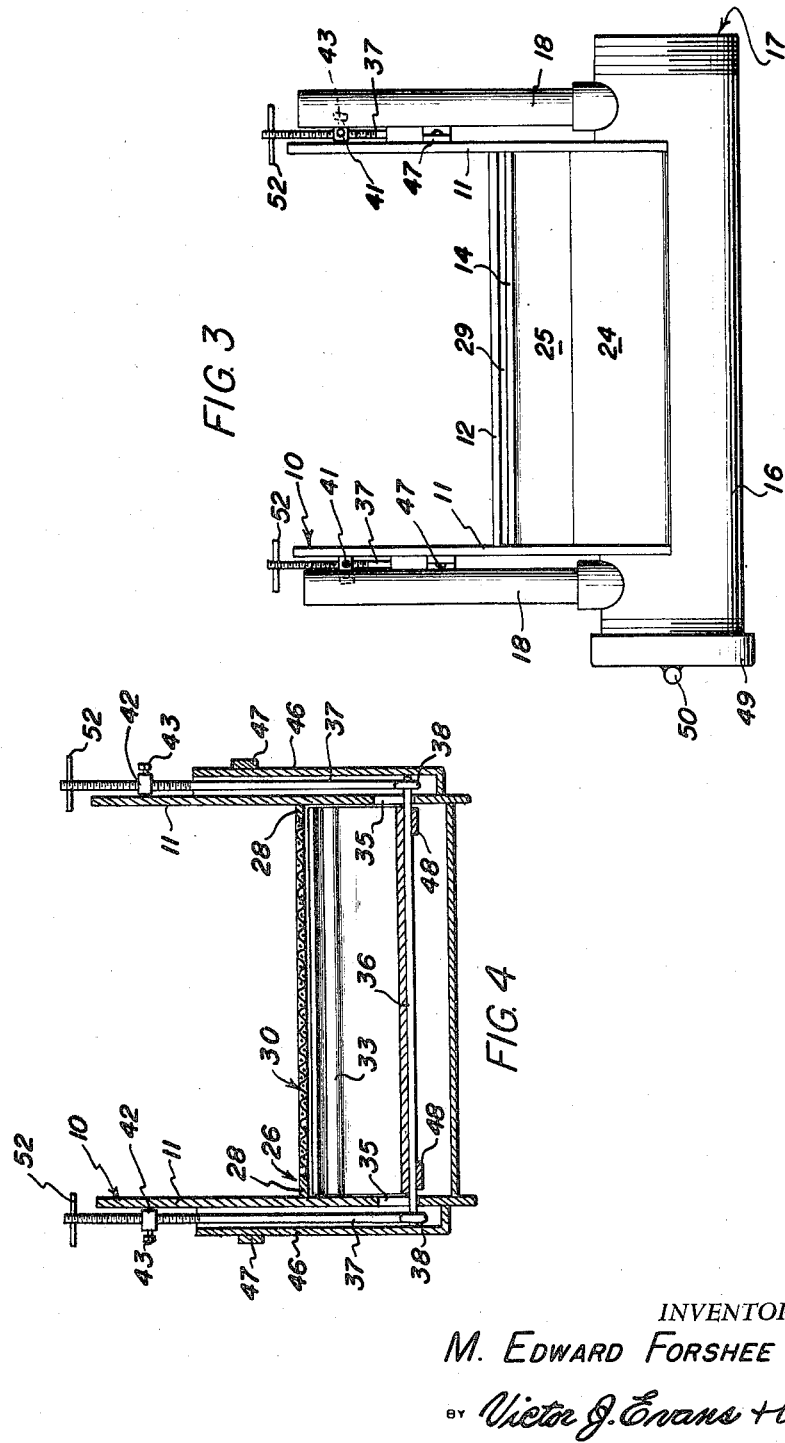

United States Patent Office 2,936,074
Patented May 10, 1960

2,936,074

BALANCE CONTROL WATER SCREEN

Morton Edward Forshee, Grand Valley, Colo.

Application July 17, 1958, Serial No. 749,181

3 Claims. (Cl. 210—116)

This invention relates to an apparatus for use in separating trash or debris from fluid such as water.

The object of the invention is to provide an apparatus which includes a means for conveniently and readily separating foreign matter or trash from a fluid such as water so that clean, filtered water can pass or be directed to a desired location, and wherein the trash or other foreign matter removed from the water can be conveyed to a separate location.

Another object of the invention is to provide a fluid filtration system wherein foreign matter or trash will be automatically separated from the water so that clean water can be supplied or provided, as for example when the water is to be used for irrigation purposes.

A further object of the invention is to provide a balance control water screen apparatus which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a plan view of the present invention.

Figure 2 is a sectional view taken on the line 2—2 of Figure 1.

Figure 3 is an end elevational view of the present invention.

Figure 4 is a sectional view taken on the line 4—4 of Figure 2.

Referring in detail to the drawings, the numeral 10 indicates a supporting structure which includes a fluid inlet end and an outlet end. The supporting structure 10 includes a pair of spaced parallel vertically disposed side walls 11. Arranged contiguous to the fluid inlet end is a horizontally disposed platform 12 which extends between the side walls 11 and which is secured thereto in any suitable manner. The numeral 13 indicates the water and trash which enter the inlet end of the device 10. The numeral 14 indicates a horizontally disposed shelf which is arranged adjacent the outlet end of the device, and the shelf 14 extends between the walls 11 and is secured thereto. The numeral 15 indicates the trash which leaves the device, and this trash 15 can be conveyed to any suitable locality.

Arranged transversely below the lower portion of the supporting structure 10 is a hollow tube 16, and as shown in Figure 1 the numeral 17 indicates an outlet end on the tube 16, and the clean filtered water is adapted to pass out the outlet end 17 to any suitable location as for example when this water is to be used for irrigating purposes.

The numeral 18 designates each of a pair of spaced parallel vertically disposed pipes which extend upwardly from the tube 16. The tube 16 is further provided with an enlarged or elongated opening 19, Figure 2.

The numeral 21 indicates an inclined base which has one end mounted below the platform 12, and the other end portion of the base 21 is supported on the flange 20. The base 21 has on its upper portion a plurality of spaced apart agitators 22 for a purpose to be later described.

There is further provided a wall member which is indicated generally by the numeral 23, and the wall member 23 includes an inclined portion 24 which extends from the tube 16 and which is secured thereto in any suitable manner, as for example by welding, and the wall member 23 further includes an upper vertically disposed section which is secured to the lower portion of the shelf 14, and this section is shown in Figure 2 and is indicated by the numeral 25.

The numeral 26 indicates a rectangular frame which includes an end member 27 that is positioned between the platform 12 and adjacent end of the base 21. The frame 26 further includes a pair of spaced parallel longitudinally extending side members 28 and an end member 29, and the end member 29 engages the upper portion of the shelf 14. The numeral 30 indicates a screen which is mounted within the frame 26, and the screen 30 functions as a filter so that trash or other foreign matter will be prevented from passing downwardly through the screen 30 while the water can pass through the screen.

Extending between the pair of side walls 11 and supported thereby is a horizontally disposed rod 31. The numeral 32 indicates a movable door which has a portion 33 pivotally or hingedly mounted on the rod 31, Figure 2. The door 32 is mounted for movement towards and away from the lower end of the base 21, as for example as shown by solid and dotted lines in Figure 2. A stop shoulder 34 is connected to the door 32 for limiting pivotal movement of the door 32 in one direction.

The side walls 11 are provided with diametrically opposed rectangular cutouts 35, and the numeral 36 indicates a horizontally disposed vertically shiftable pin which extends through the cutouts 35, Figure 4. A pair of vertically disposed similar screw members 37 have coiled portions 38 on their lower ends connected to the pin 36.

The numeral 40 designates each of a pair of hanger members which are pivotally connected to the outer surface of the side walls 11 in any suitable manner, as for example by means of pivot pins 39. Shafts 41 extend through the hanger members 40, and a head 42 on an end of each shaft 41 is connected to each corresponding screw member 37. Set screws 43 extend through the heads 42 for engaging the screw members 37. The numeral 44 indicates a counterweight which is arranged in threaded engagement with the threaded portion 45 of each shaft 41.

As shown in the drawings, the screw members 37 are arranged in casings 46 which may be retained in place by brackets 47.

The numeral 48 indicates collars on the lower portion of the door 32 through which extends the member 36.

The numeral 49 indicates a closure or cap which is mounted on an end of the tube 16. It is to be understood that the closure 49 can be mounted on either end of the tube 16 so that the clean water can be discharged from either end of the tube. The closure or cap 49 is provided with a handle piece 50 so as to facilitate manual manipulation of the cap.

The numeral 51 designates each of a pair of stop members which are secured to the outer surfaces of the side walls 11, and the stop members 51 are adapted to be used for limiting downward movement of the shaft 41.

From the foregoing, it is apparent that there has been provided an apparatus which is especially suitable for use in filtering or removing trash, foreign matter, or debris from water, so that clean filtered water can be supplied for any desired purpose, as for example for irrigation purposes. According to the present invention the device is adapted to be arranged in such a manner that the inlet water and trash as indicated by the numeral 13 in Figure 2 will flow from left to right in Figure 2 from a suitable source of supply. As this water and trash pass between the side walls 11 and over the platform 12, it is to be noted that the trash will be collected on the screen 30 while some of the water can pass downwardly through the screen 30 and onto the base 21. The members 22 function as agitators so as to help stir up or agitate the water whereby the device will operate more efficiently. With the door 32 in the lowered position as indicated in solid lines in Figure 2, it will be seen that a space is provided between the door 32 and lower end of the base 21 so that the clean filtered water can pass through the space between the door 32 and base 21 and this water can then pass down through the opening 19 and then through the tube 16 and out through the end 17 and this water from the end 17 can be conveyed or discharged to any desired locality. Meanwhile the debris or trash which accumulates on the screen 30 will be continually washed off of the screen so that this material as indicated by the numeral 15 will pass out through the right end of the device as shown in Figure 2 and this trash 15 can be deposited or conveyed to any desired location.

The weight of the water on the door 32 serves to overcome the weight of the counterweight 44 so that depending upon the amount of water above the door 32, the door 32 will occupy a different position so that the device functions in an automatic manner to control the flow of water therefrom.

The pipes 18 function as air vents. The door or gate 32 is movably mounted by means of the connection with the rod 31. If desired the cap 49 can be entirely removed so that clean filtered water can be dischraged from both ends of the tube 16. The parts can be made of any suitable material and in different shapes or sizes. The agitators 22 serve to induce a type of boiling or stirring up of the water so as to help keep the screen 30 swept clean of trash. The shelf 14 serves to support the frame 26 so that the screen 30 will be held in its proper position. Handle pieces 52 may be connected to the upper ends of the screw members 37 for facilitating the manual rotation of the screw members.

The present invention is adapted to be used for screening leaves, trash and gravel from water and it is not a sediment settling or water measuring device. The device is controlled automatically by the amount of water flowing into it, the amount being regulated to the amount of water necessary to carry away the trash. As the water varies in quantity, the device opens or closes the outlet gate 32 under the screen so as to maintain approximately the same percentage of water out the trash overflow. In other words most of the water passes out through the tube 16, but some of the water is used for carrying away or sweeping off the trash 15 from the top of the screen 30 so that the screen will be kept clean. Thus, by keeping a small amount of water flowing out the trash overflow, the trash will be carried away so that the screen will not become clogged. If water is allowed to drop straight through a screen, the trash collects on the screen so as to cause all of the water to flow over the top of the trash sealed screen.

All working parts are on the outside of the device except the outlet gate or door 32 which is on the floor of the device under the screen 30.

Thus, it will be seen that there has been provided a device which will serve to remove leaves, trash, and gravel from flowing water and the device is controlled automatically by the amount of water flowing into it. The base 21 and wall member 23 serve to completely close the bottom of the device except for the discharge opening into the pipe or ditch. The water and trash pass over the platform 12, and the agitator 22 serves to agitate the water so as to help clear the screen and avoid clogging. The pressure of flowing water to and through the screen, for the purpose of keeping sufficient water to keep the trash moving, is controlled by the balance shaft 41 which in turn regulates the outlet door 32. The balance members 44 serve to open or close the outlet door 32 under the screen so as to maintain the proper portion of water to carry the trash overflow.

If desired, the outlet can be manually controlled, and different types of weights can be used for controlling the amount of water passing through the outlet. The size of the screens can be varied as desired, and hydraulic or electric actuating devices can be used when desired or required.

Minor changes in shape, size and rearrangement of details coming within the field of invention claimed may be resorted to in actual practice, if desired.

I claim:

1. In a device of the character described, a supporting structure including vertically disposed spaced parallel side walls, a screen mounted between said side walls, an inclined base arranged below said screen, a tube arranged below said screen and extending transversely with respect to the supporting structure, agitators on the upper surface of said base, a movable outlet door arranged below said screen, a closure releasably connected to an end of said tube, and vent pipes extending upwardly from said tube.

2. In a device of the character described, a supporting structure including a fluid inlet end and an outlet end, said supporting structure including spaced parallel vertically disposed side walls, a horizontally disposed platform arranged contiguous to the inlet end of said supporting structure and extending between said side walls, a horizontally disposed shelf arranged contiguous to the outlet end of said supporting structure and extending between said side walls, and secured thereto, a horizontally disposed tube arranged transversely with respect to the lower portion of the supporting structure, a pair of vertically disposed pipes extending upwardly from said tube, a cap mounted on an end of the tube, there being an elongated opening in the upper portion of said tube, a flange extending upwardly from said tube contiguous to said opening, an inclined base having a portion thereof mounted on said flange and said base having one end secured below said platform, a plurality of agitators mounted on the upper portion of said base, a wall member extending from said tube adjacent said opening, said wall member including an inclined portion terminating in an upper vertically disposed section which is secured to the lower portion of said shelf, a rectangular frame including an end member positioned between said platform and base, said frame further including an end member engaging the upper portion of said shelf, a screen mounted in said frame, a rod extending between said pair of side walls, a door pivotally mounted on said rod, said door having a portion thereof mounted for movement towards any away from the lower end of said base, there being diametrically opposed cutouts in said side walls, a horizontally disposed pin extending through said cutouts and connected to the lower portion of said door, a pair of screw members having their lower ends connected to said pin, hangers pivotally connected to said sidewalls adjacent the outer surfaces thereof, shafts extending through said hangers and having heads connected to said screw members, and weights connected to said shafts.

3. The structure as defined in claim 2, and further including stop members for limiting downward movement of said shafts.

References Cited in the file of this patent

UNITED STATES PATENTS

| 587,999 | McMichael | Aug. 10, 1897 |
| 630,533 | Fiske | Aug. 8, 1899 |
| 1,770,637 | Wagner | July 15, 1930 |
| 2,311,858 | Nyboer | Feb. 23, 1943 |

FOREIGN PATENTS

| 550,484 | France | Dec. 14, 1922 |